(No Model.)
C. E. EATON.
CAR AXLE.
No. 284,194. Patented Sept. 4, 1883.
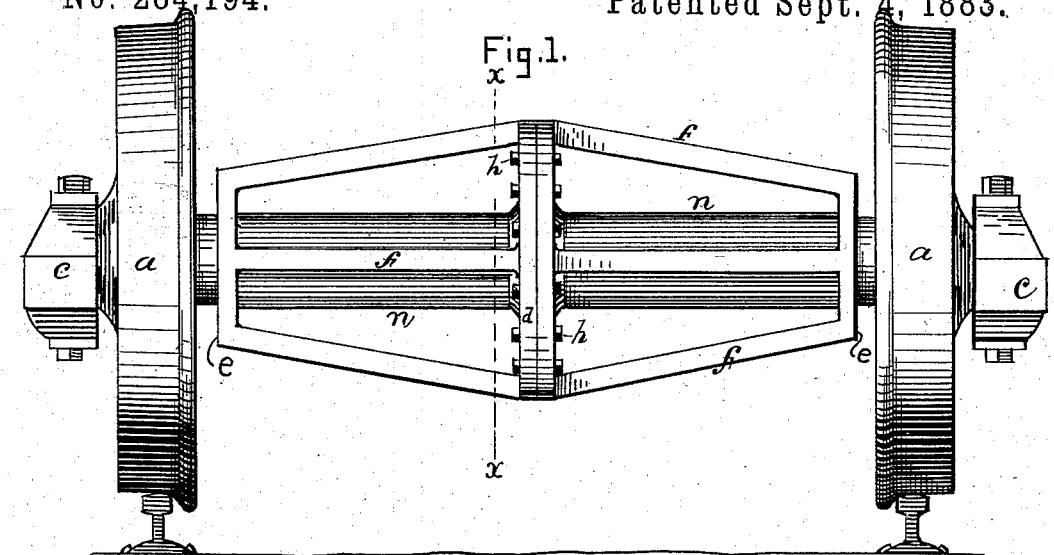
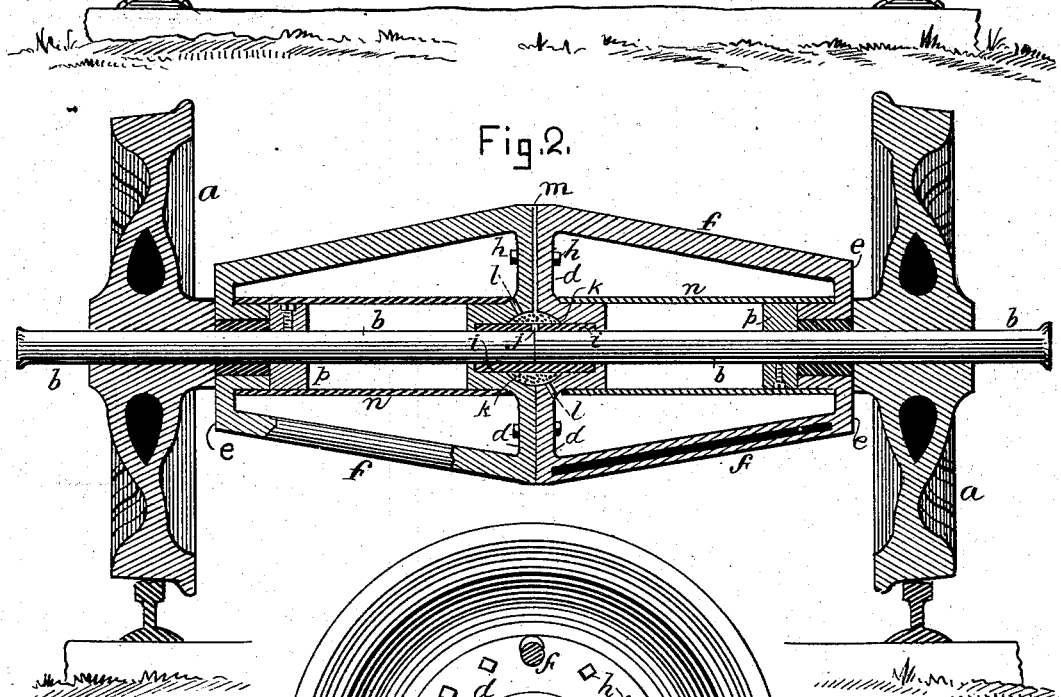
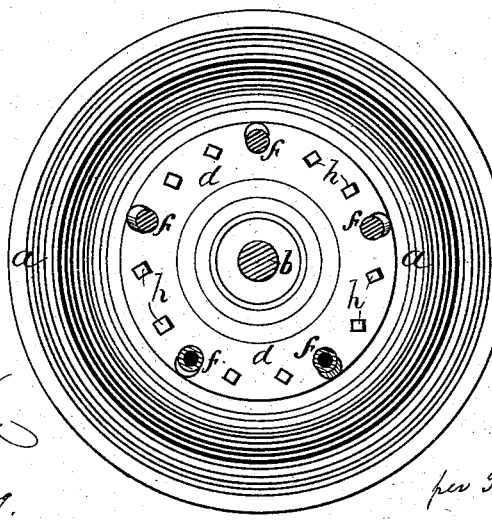
Witnesses:
H. E. Remick
Chas. S. Gooding
Inventor,
Charles E. Eaton
per Porter & Hutchinson
Attys

UNITED STATES PATENT OFFICE.

DEWITT ELLSWORTH, OF RIVERDALE, MICHIGAN.

FEED-WATER ALARM-INDICATOR.

SPECIFICATION forming part of Letters Patent No. 284,195, dated September 4, 1883.

Application filed May 1, 1883. (No model.)

*To all whom it may concern:*

Be it known that I, DEWITT ELLSWORTH, a citizen of the United States, residing at Riverdale, in the county of Gratiot and State of Michigan, have invented certain new and useful Improvements in Feed-Water Alarm-Indicators to be used in connection with inspirators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in a feed-water alarm-indicator to be used in connection with steam-boiler water-feeders of the class known as "inspirators," and has for its object to give an alarm when, from any cause, there is a stoppage of the feed-water. This object is attained by the mechanism illustrated in the accompanying drawings, forming a part of this specification, in which—

Figure 1 is an elevation, partly on the line *x x* of Fig. 2. Fig. 2 is a plan view. Fig. 3 is a plan of the lower half of the chamber, showing the valve in a horizontal position.

The letter A indicates the chamber, which is formed either of one or of two pieces attached to each other in any convenient manner, and having circular openings at each end, B' B'', for the introduction of the inlet water-pipe B at one end and the outlet-pipe C at the other.

A transverse shaft, G, extends through the chamber, and has bearings—on one side in a stuffing-box, H, and in the shell of the chamber on the other—the end of the shaft being covered by a cap, H'', attached to the chamber in any convenient manner.

The shaft G has a lever, F, secured to its outer end, and carries on the inside of the chamber two arms, J, secured thereto by set-screws. Between these arms is a flap-valve, K, which swings freely on pivots *i i*.

L is a cap on the upper side of the chamber.

M is a stop attached to the upper half of chamber A, on the inside, and intended to limit the movement of the flap-valve K in the direction of the pipe C and prevent its swinging too far in that direction.

C' is a steam-pipe, secured to and communicating at its lower end with the pipe C, and at its upper end with the boiler, in any convenient and approved manner, and has attached to it a steam-whistle, D, having a crank-arm, D', of the usual form, to which is attached one end of a cord, E, while the other end of the cord is secured to the lever F, as shown in the dotted line in Fig. 1.

B is a water-pipe from the well or other source of supply. The water passes through this pipe and the chamber A and pipe C on its way to the boiler. Its passage through the valve K causes the valve to assume the position shown in the dotted lines in Fig. 1. Should the water cease to flow by reason of any derangement of the machinery or other cause, the specific gravity of the valve will carry it back to a perpendicular position, as indicated in the full lines of Fig. 1. The steam, then coming from the boiler through the pipe C' and backing through the pipe C, will bear against the valve and cause the arms J to assume a horizontal position, and turn the shaft G, with its lever F, in a manner to draw the cord E and operate the steam-whistle D through its lever D, and thus sound the alarm.

Having described my invention, what I desire to secure by Letters Patent, and to claim, is—

1. In a feed-water alarm-indicator constructed substantially as shown, the chamber A, having pipes B and C, in combination with the valve K, for the purpose set forth.

2. In a feed-water alarm-indicator constructed substantially as shown and described, the chamber A, having the stop M, in combination with the shaft G, having the lever F, arms J, and valve K, for the purpose set forth.

In testimony whereof I affix my signature in the presence of two witnesses.

DEWITT ELLSWORTH.

Witnesses:
 ROBERT MOBLO,
 LAFAYETTE STEVENS.